March 21, 1944.  G. S. DOW, JR., ET AL  2,344,683
CLAMP AND MOUNTING BRACKET
Filed Aug. 20, 1941   2 Sheets-Sheet 2

Inventors
Grove S. Dow Jr. &
George W. Onksen Jr.
By Blackmor, Spencer & Hunt
Attorneys Patented Mar. 21, 1944

2,344,683

UNITED STATES PATENT OFFICE 2,344,683

CLAMP AND MOUNTING BRACKET

Grove S. Dow, Jr., and George W. Onksen, Jr., Anderson, Ind., assignors to General Motors Corporation, Detroit, Mich., a corporation of Delaware Application August 20, 1941, Serial No. 407,676

2 Claims. (Cl. 24—263)

This invention relates to mounting means such as are used to secure a lamp to the front end of an automobile. It relates specifically to a clamp and bracket for mounting a lamp on a bumper bar.

Clamps have been used in the past for mounting brackets on bumper bars. However, these clamps have never been entirely satisfactory because they have not been flexible enough of application to permit their successful use on a variety of bumper bars differing considerably in width and thickness. A clamp which will be satisfactory on a bumper bar of given cross-sectional dimensions would usually not work satisfactorily on a bumper bar of greater dimensions due to the introduction of forces in the latter case tending to make the clamping members unstable.

In our invention the clamp which engages the bumper bar or any other suitable support is designed with lips which readily accommodate supports of different thickness. The two opposed members of the clamp are furthermore provided with bearing members extending toward each other to increase the bearing length of the lips to accommodate supports of varying widths, and the lips are designed also to fit easily on bars of different thicknesses. A further advantage of our invention is the increased wedging angle in the clamping members made possible by the greater bearing length. The greater wedging angle reduces liability of clamp breakage due to the wedging action.

Figure 1 of the drawings is a view with parts broken away and in section showing our clamp and mounting bracket in place on the support bar of an automobile bumper.

Figure 1:
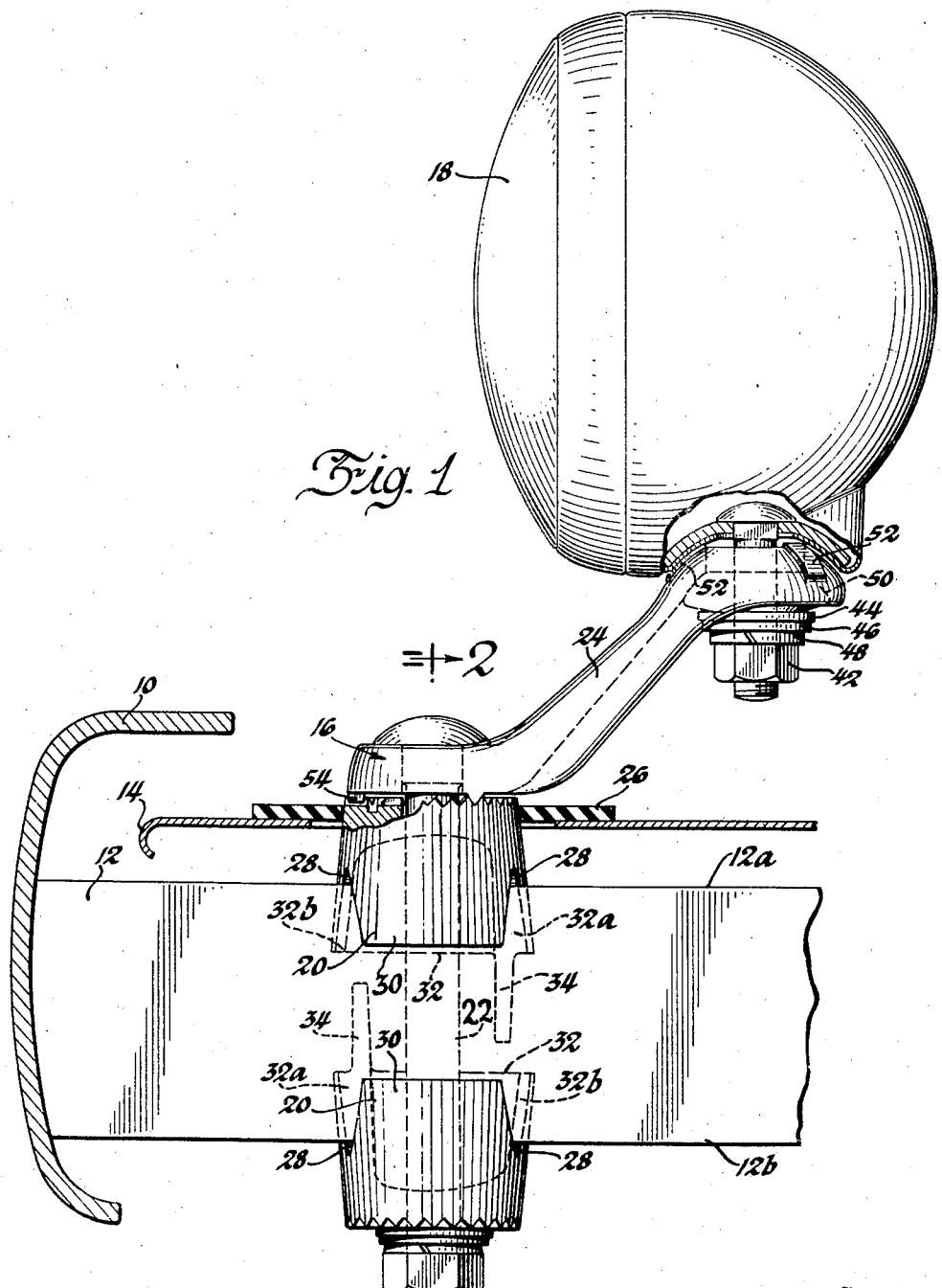

A vehicle bumper 10 is illustrated in Figure 1; this bumper is held in position by a support bar 12 having substantially parallel edges 12a and 12b. A splash pan 14 extends substantially the length of the bumper covering support bar 12. A clamp and mounting bracket assembly indicated generally by 16 is secured to support bar 12. Assembly 16 may be used to support a lamp, or a horn, or some ornamental object. We have shown a fog lamp 18 in position on assembly 16.

The clamp and mounting bracket assembly of this invention comprises principally opposed, similar clamping members 20 held together in opposed clamping relation on support bar 12 by any suitable holding means such as bolt 22. A mounting bracket 24 is conveniently held in place by bolt 22. If desired, a gasket 26 may be provided to cover the opening in the splash pan.

The clamping members of our invention are conveniently made generally cup-shaped. A notch or slot 28 is cut through each member 20 near one edge of the cup, forming lips 30 and 32. Although the lip 32 on each member 20 is made up of the two aligned edges 32a and 32b formed by slot 28 cut in the cup, these two edges function as one member and will be considered as one lip in this description. Lip 32 is formed substantially parallel to the axis of bolt 22, as is readily seen in Figure 2. Where the support 12 is substantially rectangular in cross section, as is the one shown in Figure 2, lip 32 is parallel to one face of support 12 and fits flat against said face.

Figure 2:
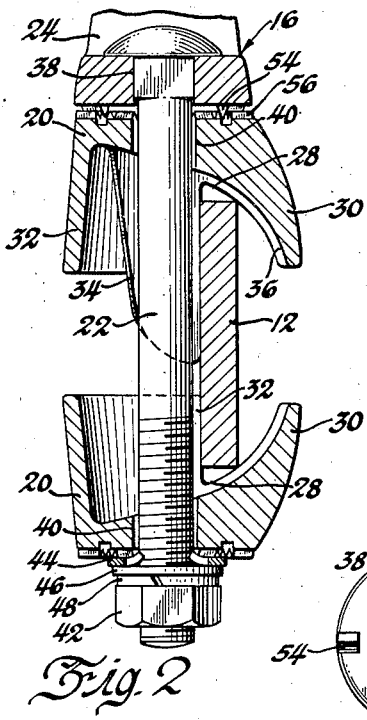
Figure 2 is a view in section substantially on line 2—2 of Figure 1.

Clamps have been made in the past having substantially V-shaped notches or slots to form clamping lips. However, where the support on which the clamping members were mounted increased in width so as to increase the distance between clamping members, the stability of the clamp formed by the opposed members was decreased because of the relatively smaller bearing length of the lips on the support bar as compared with the width of the bar. This disanvantage has been remedied in our invention by the addition of an extension 34 along edge 32a of lip 32. The right edge of extension 34 as seen in Figure 2 is in the plane of edges 32a and 32b, so that this edge also fits flush against the flat face of support 12. Extension 34 is preferably provided on each of the opposed clamping members 20 as shown in Figure 1. Member 34 extends toward the opposed clamping member 20 and beyond the limits of lip 32, thereby in effect increasing the bearing length of lip 32 on the support bar.

Figure 3:
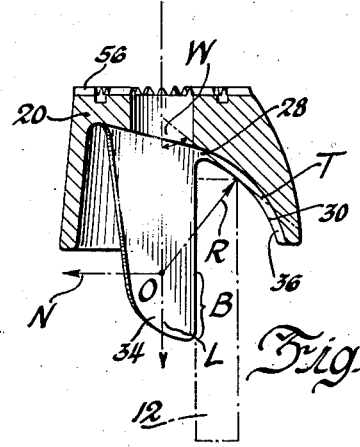
Figure 3 is a longitudinal sectional view of one of the clamping members with a diagrammatic indication of the forces operating on said member.

As best seen in Figure 3, lip 30 is designed so that its longitudinal section forms a substantially circular arc; the centers of curvature of the circular arcs making up lip 30 form a line perpendicular to the longitudinal axis of member 20 which passes through extension member 34. Lips 30 is relieved intermediate its edges as indicated at 36, insuring that contact of support bar 12 will be established with lip 30 only at its edges as shown in Figures 2 and 3. This fact makes for greater stability, in that contact is established at two points on lip 30 which are as widely separated as they can be. Another advantage is that accurate surfaces of the cooperating parts are not necessary to insure perfect line contact, as would be the cause if clamping members 20 were designed to contact the support bar along the entire length of the lips. Furthermore, the contact point of bar 12 with lip 30 along one edge of lip 30 is in a plane normal to the bar, said plane including extension member 34. It is evident from Figure 1, therefore, that member 34 gives the extended bearing length only at one side of each of clamping members 20. This has been found sufficient for all applications made thus far of this invention by the inventors. It may be noted here, however, that the occasion might arise in which it would be desirable to furnish an extension 34 on each side of member 20. However, we prefer the design shown, for the reason that, in some cases, support bar 12 will be so narrow that two extension members on one clamping member 20 would interfere with the extension members on the opposed clamping member. With the design shown no such interference is possible. As is indicated in Figure 1, members 34 extend toward each other from opposite sides of bolt 22, and are formed along the inside of one edge of lip 32 so that clamping members 20 could be nested together if a support bar were used which was narrow enough to permit such nesting. It will be noted that the two edges 32a and 32b of lip 32 have the advantage mentioned in connection with lip 30, that of contacting the support bar at widely separated points.

In Figure 3 we have illustrated diagrammatically the forces which are applied to each of clamping members 20. One of these forces, indicated by arrow R, passes through the point of contact of support bar 12 and lip 30 and is normal to lip 30 at this point of contact. The arrow marked L represents the force acting along the long axis of member 20; and the arrow marked N represents the force normal to extension 34. As indicated in Figure 3, arrow N passes through the intersection of arrows L and R. Because of the circular contour of a longitudinal section through lip 30, the point of intersection of these forces remains constant—i. e., the center of curvature O, which falls on member 34. It is evident, therefore, that the length B indicated in Figure 3 is a constant and that this length below the point O gives stability to the clamping member by furnishing an arm or bearing member which resists any tendency toward rotation of member 20 about an axis parallel to bar 12.

Angle W is the angle between any line parallel to the longitudinal axis of member 20 and line T. Line T is the tangent to the circular arc defining lip 30 at the point of contact of lip 30 with bar 12. It is evident that the smaller angle W becomes, the greater the mechanical advantage of a force pushing against the sides of the angle W and, therefore, the greater the strain on the clamp will be. Angle W will decrease with increasing thicknesses of support bar 12, but even the limiting or extreme value of angle W would not be such as to set up excessive stresses in member 20.

Figure 4:
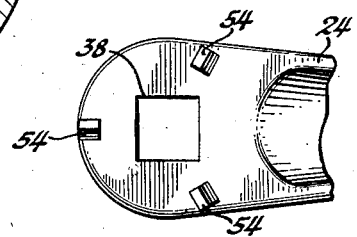
Figure 4 is a view of one end of the mounting bracket used with our clamps.

Figure 4 is a plan view of the end of mounting bracket 24 which engages one of clamping members 20. This end is provided with a square opening 38 to receive and hold the head of bolt 22 in nonrotative relation. Members 20 are provided with openings 40 to receive bolt 22 which holds members 20 in aligned relation on opposite sides of the support bar. The two clamping members 20 are held in tight engagement with support bar 12 between the head of bolt 22 and a nut 42. We have illustrated the assembly in Figure 2 as being provided further with a theft proof washer 44, a plain washer 46 and a lock washer 48. These same elements may be used to hold lamp 18 in position at the other end of bracket 24. Here, however, the bearing washer 50 is added. As can be seen in Figure 1, the upper end of bracket 24 may be provided with three equally spaced raised portions, or lands, 52 to insure good seating of the mounting socket of lamp 18 on bracket 24.

Figure 5:
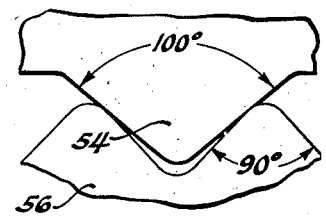
Figure 5 is a detail view showing a serration of the mounting bracket engaging corresponding teeth or serrations on one of the clamping members.

Figure 4 also shows teeth or serrations 54 which may be three in number and equally spaced about the periphery of the mounting face of bracket 24. These teeth or serrations cooperate with a full circle of teeth or serrations 56 on clamping means 20. It will be noted that both clamping means are provided with the serrations. This is done to make the clamping means interchangeable even though the serrations on only one of them is functional in the assembly shown. As can be seen in Figure 5, the included angle between the sloping sides of tooth 54 is approximately 100°. The included angle between the sloping sides of a single tooth 56 is 90°. The purpose of this design is to insure that the mating teeth register at their sides and are clear at the bottom. If the angles on the mating pieces were the same, small errors in the radii at the tops and bottoms of the serrations would cause the teeth or serrations to register at the bottoms and not be held tight against rotation.

Figure 6:
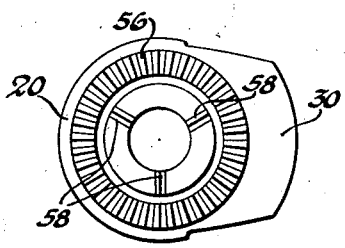
Figure 6 is a view of one of the clamping members from the end provided with serrations.

As is shown in Figure 6, clamping member 20 may be made with the indicated full circle of serrations 56 and with a small circle of three serrations of teeth 58. This has been done to make it possible to use clamping members 20 with an old style of mounting bracket having a full circle of serrations cooperable with the three equally spaced teeth 58.

Figure 7:
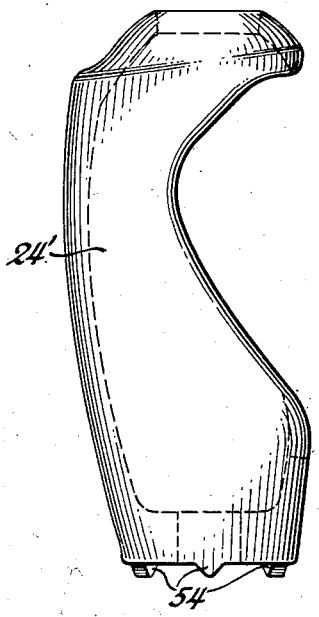
Figure 7 shows another form of mounting bracket which may be used with the clamp of our invention.

Figure 7 illustrates an alternate form of mounting bracket 24' which may, if desired, be used instead of bracket 24 shown in Figure 1. Bracket 24' can be used to position lamp 18 directly above support bar 12, where this is desired. Moreover, the head of bolt 22 is concealed from view when bracket 24' is used.

We claim:

1. A supporting bracket adapted to be secured to a bar of substantially rectangular cross-section including a pair of relatively movable clamping members with means to draw said members together to clamp the bar therebetween in which each of said clamping members comprises a cup-shaped member having a transverse slot to provide spaced lips to receive an edge of the bar, one of said lips being formed with spaced arc-shaped surfaces adapted to extend on one side of the bar and contact the corner of the edge of the bar at longitudinally spaced points, and the other of said lips being formed with spaced flat surfaces adapted to engage the face of the bar at longitudinally spaced points on the opposite side thereof.

2. A supporting bracket adapted to be secured to a bar of substantially rectangular cross-section including a pair of relatively movable opposed clamping members with means to draw said members together to clamp the bar therebetween in which said clamping members are formed with transverse slots to provide spaced lips to receive opposite edges of the bar with the lips of each member extending towards the lips of the other member, one of said lips on each member including a portion adapted to extend on one side of the bar and contact only the corner of the adjacent edge of the bar, and the other lip of each member being formed to provide spaced flat surfaces adapted to engage the face of the bar on the opposite side thereof at longitudinally spaced points, one of said spaced flat surfaces on each member being provided with an extension adapted to also contact the face of the bar with the extensions on opposite members longitudinally spaced with reference to the bar whereby said extensions may extend beyond the longitudinal center of a bar of relatively narrow width without interference with one another.

GROVE S. DOW, JR.
GEORGE W. ONKSEN, JR.